Feb. 9, 1965    H. W. DIETERT    3,168,926
WEIGHING AND TRANSFER APPARATUS
Filed Feb. 18, 1963    7 Sheets-Sheet 1
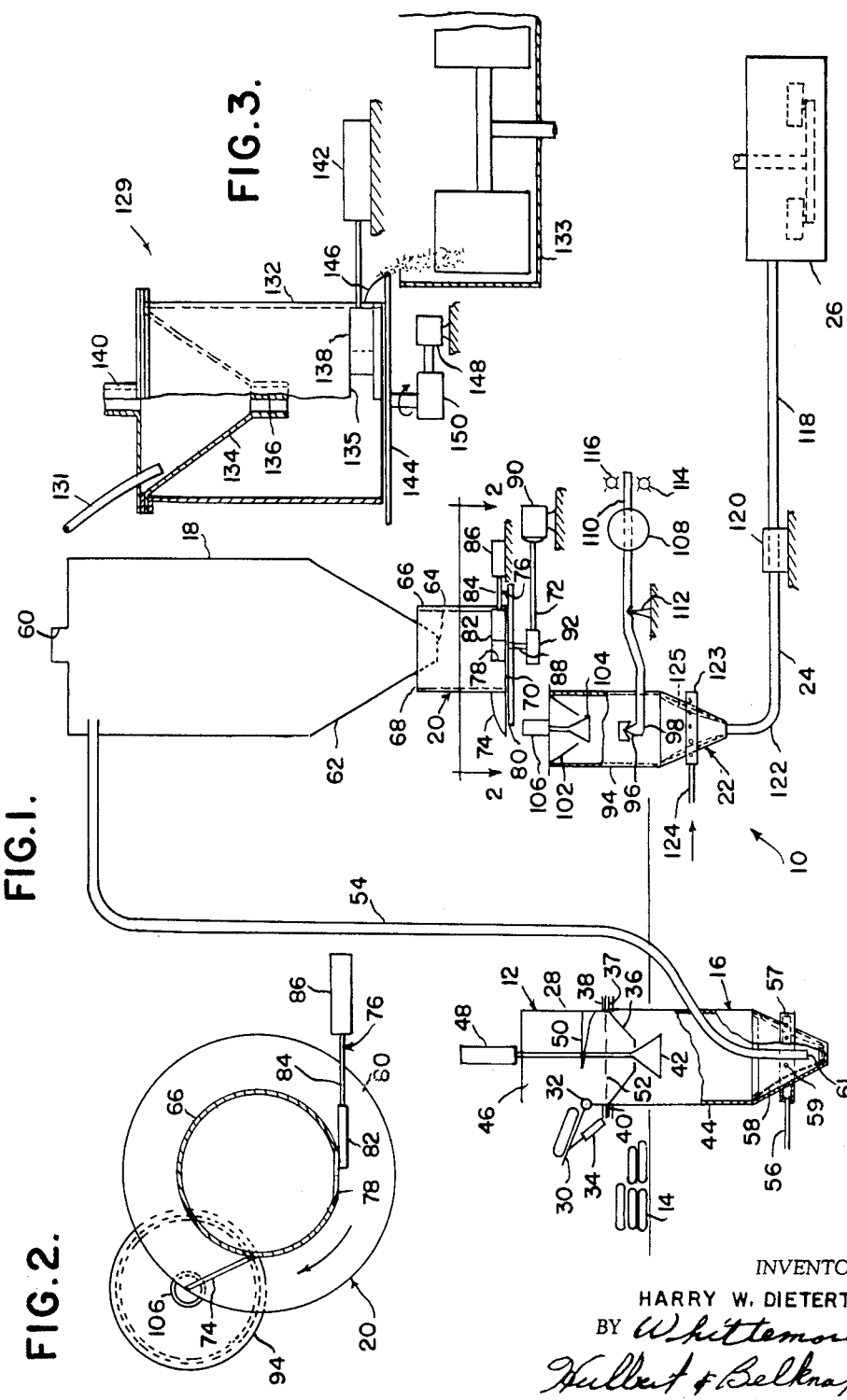
INVENTOR.
HARRY W. DIETERT
BY Whittemore,
Hulbert & Belknap
ATTORNEYS

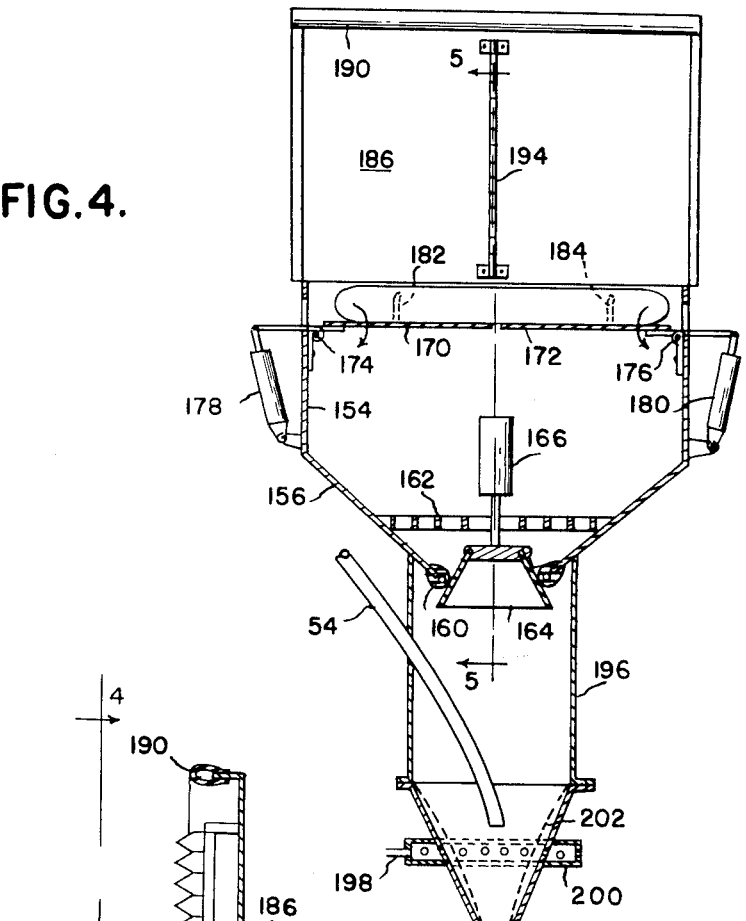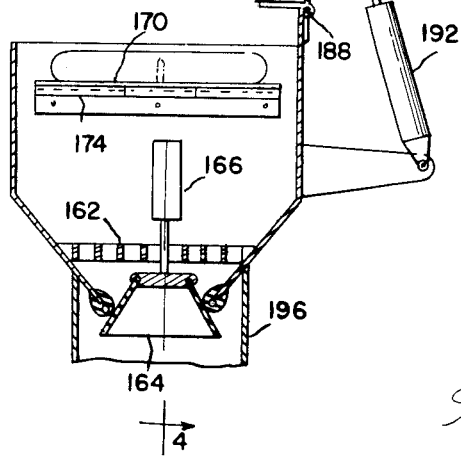

Feb. 9, 1965  H. W. DIETERT  3,168,926
WEIGHING AND TRANSFER APPARATUS
Filed Feb. 18, 1963  7 Sheets-Sheet 3
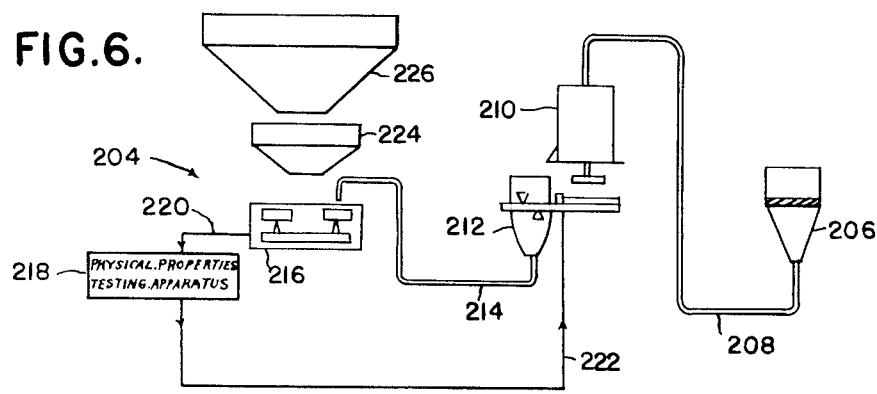
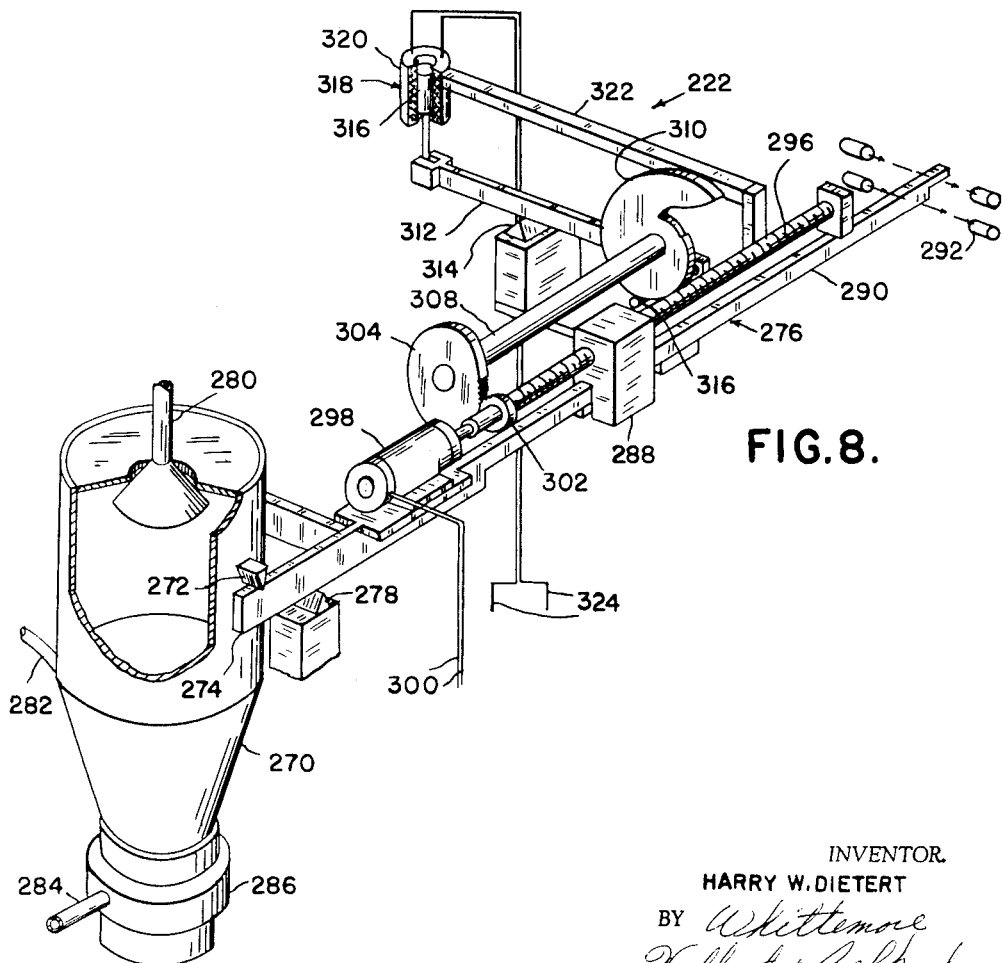
INVENTOR.
HARRY W. DIETERT
BY Whittemore
Hulbert & Belknap
ATTORNEYS Feb. 9, 1965    H. W. DIETERT    3,168,926
WEIGHING AND TRANSFER APPARATUS
Filed Feb. 18, 1963    7 Sheets-Sheet 4
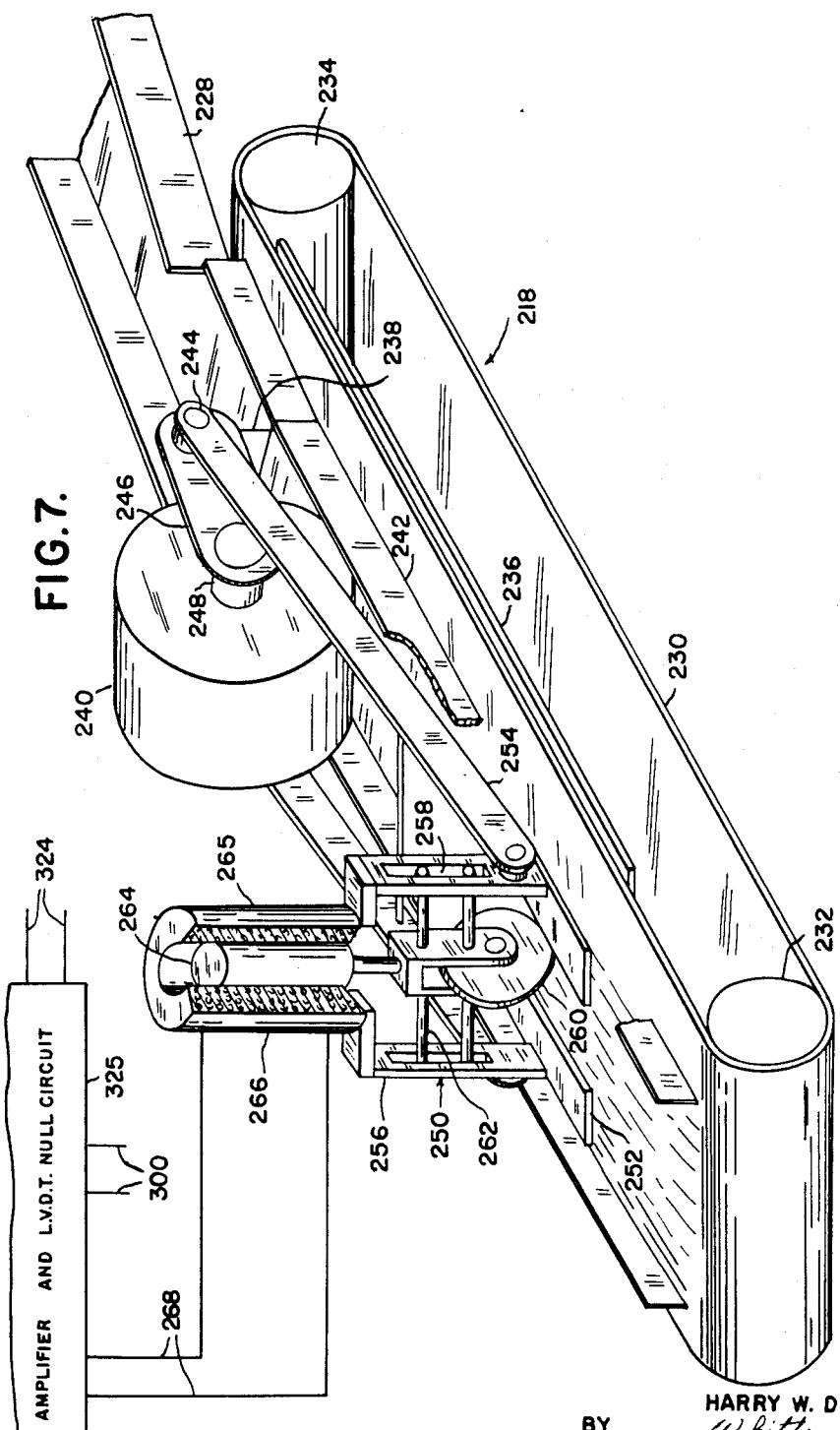
INVENTOR
HARRY W. DIETERT
BY Whittemore
Hulbert & Belknap ATTRNEYS Feb. 9, 1965    H. W. DIETERT    3,168,926
WEIGHING AND TRANSFER APPARATUS
Filed Feb. 18, 1963    7 Sheets-Sheet 5
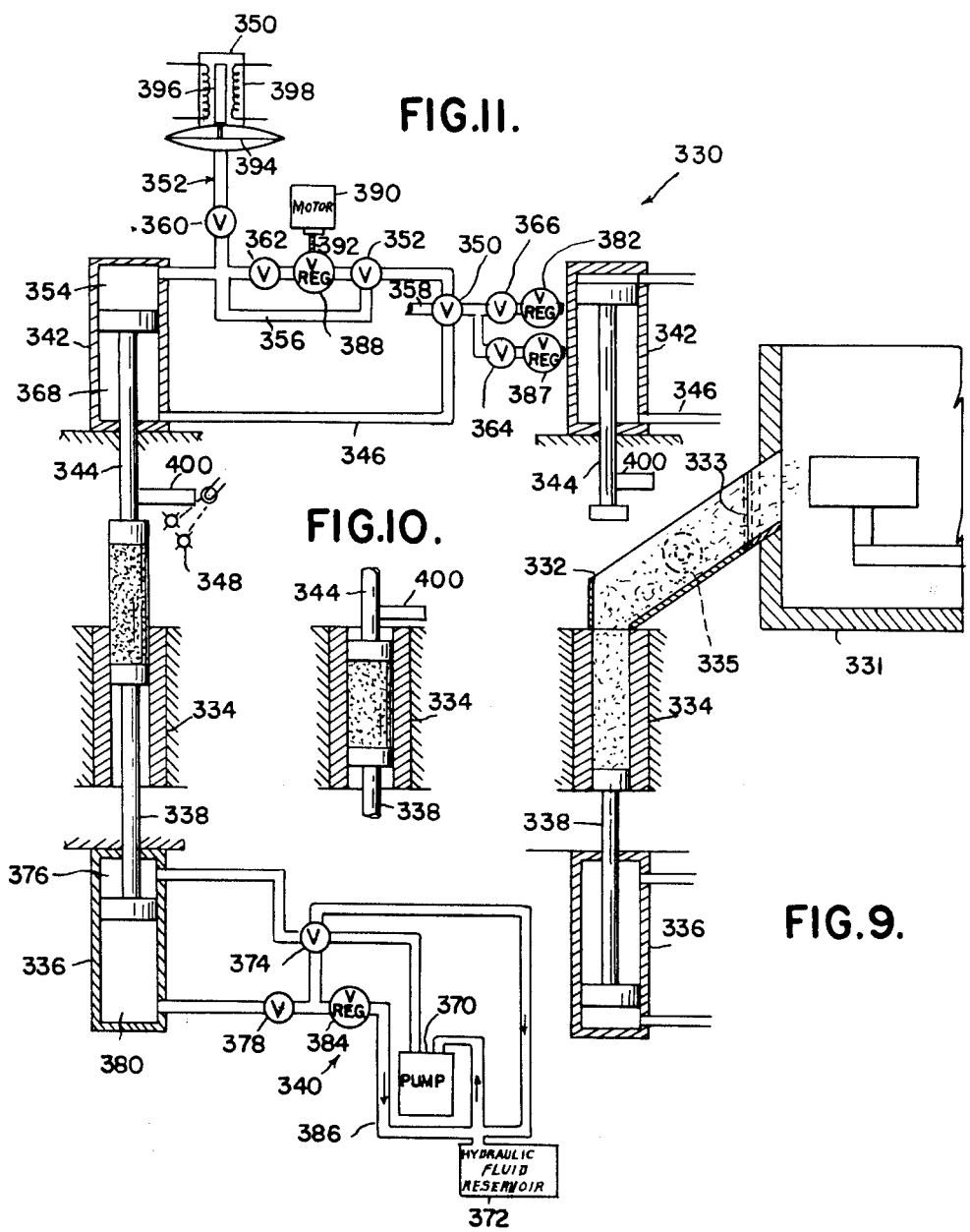
INVENTOR.
HARRY W. DIETERT
BY
ATTORNEYS

INVENTOR.
HARRY W. DIETERT

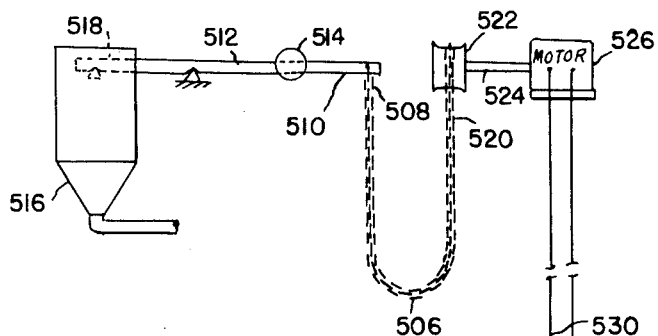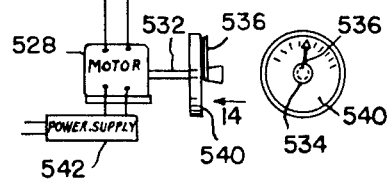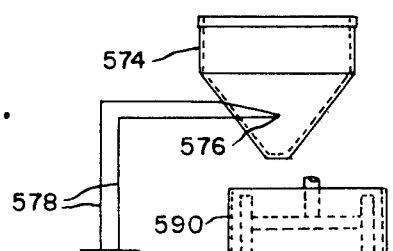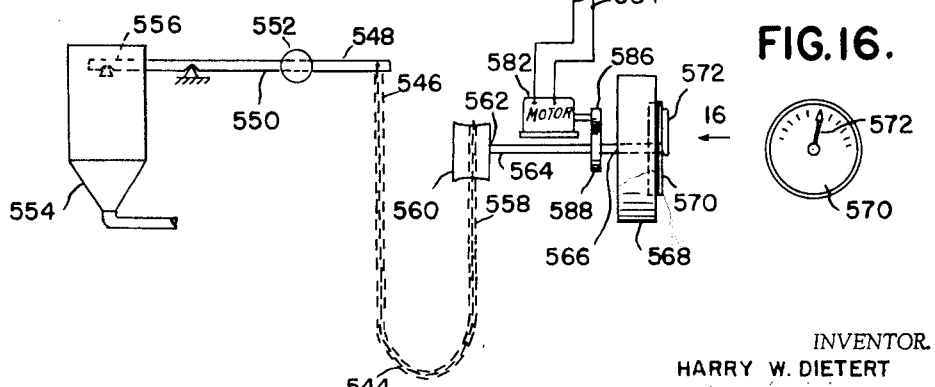

United States Patent Office 3,168,926
Patented Feb. 9, 1965

3,168,926
WEIGHING AND TRANSFER APPARATUS
Harry W. Dietert, Kerrville, Tex., assignor to Harry W.
Dietert Co., Detroit, Mich., a corporation of Michigan
Filed Feb. 18, 1963, Ser. No. 259,069
17 Claims. (Cl. 177—114)

The invention relates to weighing and transfer apparatus and refers more specifically to apparatus for opening sacks of granular material bonding agent or similar additive, weighing a selected weight of the additive and means for transferring the additive from the sack opening apparatus to the weighing apparatus and then to a mixer including structure for determining the physical properties of granular material in the mixer and varying the selected weight of additive in accordance therewith and means for compensating the selected weight of additive for different granular material mixes and the temperature thereof.

In the conditioning of granular material, such as sand, in, for example, foundries, the granular material is usually mixed with water, clay and additives such as cushioning and bonding agents. The weight of additives necessary depends on the physical properties desired in the granular material, the type of additive and the type and temperature of the granular material.

In the past the bonding agents and other additives have been added by hand through the use of cups or shovels so that accurate control over the amount of bonding agent added to a particular mix of granular material has not been possible. Further, manual unloading, weighing and transferring of bonding agents is not in accordance with the need for automation in competitive industry today.

In addition, it is desirable to condition the granular material closely adjacent the point of use thereof to prevent changes in the condition of the granular material in transportation thereof to the point of use, such as would occur due to the evaporation of moisture therefrom. It is also desirable to accomplish unloading and weighing of the bonding agent or other additive at a location remote from the actual point of use of the conditioned granular material since considerable dust generally accompanies these operations. It is even desirable to remove the breaking open of sacks of bonding agents from the area of weighing thereof for the same reason.

It is therefore one of the objects of the present invention to provide improved apparatus for opening sacks of bonding agent or similar material and for transporting the material to a remote location for storage.

Another object is to provide apparatus for weighing stored bonding agent or similar material and for transporting a predetermined weight of the material to a remotely located mixer.

Another object is to provide apparatus for determining a physical property of granular material and weighing a weight of bonding agent in accordance with the physical property determined.

Another object is to provide weighing and transfer apparatus for a finely divided material, such as a granular material bonding agent, including structure for opening sacks of the material, means for transferring the material from the sack opening structure to a storage bin at a remote location, structure for feeding the material from the storage bin into weighing apparatus, weighing apparatus for weighing a selected weight of the material and means for transferring the selected weight of material from the weighing apparatus to a mixer at a remote location.

Another object is to provide weighing and transfer apparatus for use in conditioning granular material including a mixer for the granular material, physical properties testing apparatus for producing a signal variable with the physical properties of the granular material, structure for opening sacks of bonding agent, means for transporting the bonding agent from the sack opening structure to a storage bin at a remote location, structure for feeding the material from the storage bin into weighing apparatus, means for varying the quantity of bonding agent weighed by the weighing apparatus in accordance with the signal developed by the physical properties testing apparatus and means for transferring the weighed bonding agent from the weighing apparatus to a mixer at a remote location.

Another object is to provide weighing and transfer apparatus as set forth above including means for compensating the weight of bonding agent weighed in accordance with the temperature of the granular material.

Another object is to provide weighing and transfer apparatus as set forth above including means for compensating the weight of bonding agent weighed in accordance with the type or mixture of granular material.

Another object is to provide improved physical properties testing apparatus for determining a physical property of material such as foundry sand.

Another object is to provide weighing apparatus for weighing bonding agent or the like to be added to granular material responsive to a signal developed in accordance with a physical property of the granular material to select a weight of additive for adding to the granular material in accordance with the physical property determined.

Another object is to provide improved physical properties testing apparatus for determining a physical property of granular material such as foundry sand and developing a signal in accordance therewith and additive weighing apparatus for weighing bonding agent or the like to be added to the granular material responsive to the signal to select a weight of additive for adding to the granular material in accordance with the physical property determined.

Another object is to provide improved means for opening sacks of finely divided material, such as a granular material bonding agent, in apparatus as set forth above.

Another object is to provide improved means for transferring finely divided material between remote locations in apparatus as set forth above.

Another object is to provide improved means for feeding finely divided material from a storage bin in apparatus as set forth above.

Another object is to provide improved means for weighing a predetermined amount of finely divided material in apparatus as set forth above.

Another object is to provide weighing and transfer apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a diagrammatic representation of the weighing and transfer apparatus of the invention.

FIGURE 2 is an enlarged partial cross section of the weighing and transfer apparatus illustrated in FIGURE 1 taken substantially on the line 2—2 in FIGURE 1.

FIGURE 3 is a diagrammatic representation of a portion of a modification of the weighing and transfer apparatus illustrated in FIGURE 1.

FIGURE 4 is a diagrammatic section view of a modified structure for opening sacks of additive for use in weighing and transfer apparatus as illustrated in FIGURES 1 through 3 taken on line 4—4 in FIGURE 5.

FIGURE 5 is a section view of the modified structure for opening sacks illustrated in FIGURE 4 taken on line 5—5 in FIGURE 4.

FIGURE 6 is a diagrammatic representation of weighing and transfer apparatus constructed in accordance with the invention including physical properties testing apparatus and means for varying the amount of additive weighed in accordance with the physical properties of granular material.

FIGURE 7 is a diagrammatic representation of the physical properties testing apparatus of the weighing and transfer apparatus illustrated in FIGURE 6.

FIGURE 8 is a diagrammatic representation of the weighing apparatus of the weighing and transfer apparatus illustrated in FIGURE 6.

FIGURES 9 through 11 are diagrammatic representations of another physical properties testing structure for use in weighing and transfer apparatus as illustrated in FIGURE 6.

FIGURE 13 is a diagrammatic representation of apparatus for compensating weighing apparatus used in the weighing and transfer apparatus of the invention for different granular material of mixes thereof.

FIGURE 14 is an elevation view of part of the compensating apparatus illustrated in FIGURE 13 taken in the direction of arrow 14 in FIGURE 13.

FIGURE 15 is a diagrammatic representation of apparatus for compensating weighing apparatus used in the weighing and transfer apparatus of the invention for the temperature of the granular material.

FIGURE 16 is an elevation view of part of the compensating apparatus illustrated in FIGURE 15 taken in the direction of arrow 16 in FIGURE 15.

Figure 12:
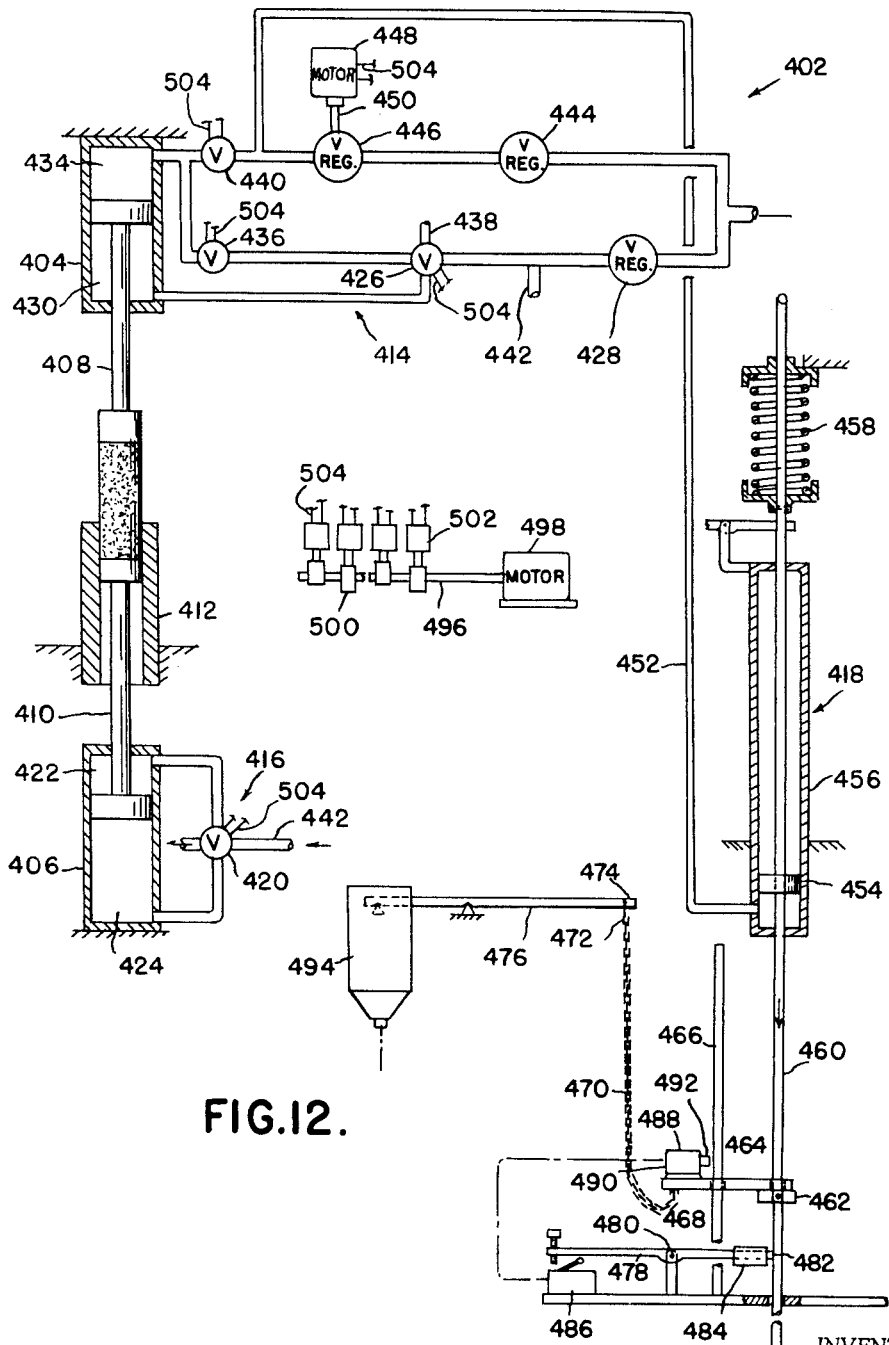
FIGURE 12 is a diagrammatic representation of a modification of the physical properties testing structure illustrated in FIGURES 9–11.

With particular reference to the figures of the drawing, one embodiment of the invention will now be considered in detail.

As shown in FIGURE 1, the weighing and transfer apparatus 10 includes structure 12 for opening sacks 14 of bonding agent and means 16 for transferring the bonding agent to the storage bin 18 after the sacks have been opened. The apparatus 10 further includes the structure 20 for feeding bonding agent from the storage bin 18 into the weighing apparatus 22 and means 24 for transferring the bonding agent from the weighing apparatus 22 to the sand mixer 26.

More specifically the structure 12 for opening the sacks 14 includes a housing 28 having a door 30 secured thereto by the hinge pivot 32. The door 30 may be selectively pivoted about the hinge 32 by the piston and cylinder structure 34 which may be energized by convenient means such as a solenoid operated valve responsive to an operator controlled switch (not shown).

The housing 28 is provided with a truncated conical skirt 36 secured over the bottom thereof by means of an annular flange 37 around the outer periphery thereof clamped between the annular flanges 38 and 40 on the housing 28 and tank 44. The skirt 36 in conjunction with the conical valve 42 provides means for sealing the tank 44 located beneath the housing 28 from the housing 28. Valve 42 is actuated by air cylinder 48 which may be connected to be actuated immediately prior to introduction of air under pressure into the tank 44, by any convenient circuitry and valving means (not shown).

The knife blade 50 serves to split open individual sacks 14 as they are thrown thereon due to pivoting of the door 30 into a closed position. Grate 52 is provided to receive the sacks 14 after they have been split open by the blade 50. The bonding agent is allowed to flow through grate 52 past valve 42 into the tank 44 from housing 28. Grate 52 is also held in position between the annular flanges 38 and 40.

The means for transporting the bonding agent from the tank 44 to the storage bin 18 includes the conduit 54 between the tank 44 and storage bin 18 and the air supply line 56 through which air from a source (not shown) under pressure of, for example, 15 pounds per square inch is fed to the annular air manifold 57 and into the tank 28 through the openings 59 in the air manifold. The annular lining member 58 which may be of canvas or monel filter material is provided to disperse the air evenly through the bonding agent in the tank 28 so that the bonding agent is fluidized and passages are not provided therethrough directly from the air supply line 56 or openings 59 to the conduit 54. Conduit 54 extends into the tank 44 with a gradual curvature and terminates with the open end 61 thereof adjacent the bottom of the tank 44 as shown in FIGURE 1.

Storage bin 18 is substantially cylindrical, as shown, and is provided with an air exhaust stack 60 at the top thereof. The bonding agent passed into the storage bin 18 through conduit 54 is permitted to flow freely from the lower end 62 thereof without hindrance due to the provision of an opening 64 in the end 62 of the storage bin 18 and the sixty degree sloping sides of this end of the bin.

The structure 20 for feeding the bonding agent from the storage bin 18 into the weighing apparatus 22 comprises a cylindrical tank 66 having an open upper end 68 and a closed lower end 70 into which the bonding agent from the storage bin 18 is passed by gravity, rotating disc structure 72, baffle 74 and feed opening regulating structure 76. The cylindrical tank 66 is provided with an opening 78 adjacent the bottom thereof through which additive flows by gravity onto the disc 80 of the rotating disc structure 72.

The feed opening regulating structure 76 includes the closure 82 for opening 78 reciprocally mounted on piston rod 84 actuated by the air cylinder 86. Air cylinder 86 is connected through appropriate valves and circuits (not shown) to the photoelectric cells 114 and 116 to be responsive to the position of the weighing apparatus 22 to provide a controlled flow of bonding agent from the tank 66, as will be considered subsequently.

The rotating disc structure 72 includes the rotatable disc 80 mounted for rotation on the shaft 88. The shaft 88 is in turn rotated by the motor 90 through the gear box 92. Motor 90 is also responsive to the position of the weighing device 22 through convenient circuitry, as will be considered subsequently.

Baffle 74 is positioned, as best shown in FIGURE 2. Thus in operation, as the disc 80 rotates clockwise the bonding agent fed through the opening 78 from the tank 66 onto the disc 80 is cammed from the rotating disc 80 by the baffle 74 into the hopper 94 of the weighing apparatus 22.

The weighing apparatus 22 includes the hopper 94 which is pivotally supported on the knife edge 96 on the end 98 of the balance beam 100. Hopper 94 is provided with a conical skirt 102, conical valve 104 and air cylinder or other convenient actuating means 106 for closing valve 104, the operation of which may be through convenient circuitry and valves (not shown).

The movable weight 108 is provided on the other end 110 of the balance beam 100. The balance beam 100 is mounted for pivoting about the inverted knife edge 112. End 110 of the balance beam is positioned to shade the photoelectric cells 114 and 116 successively as the weight of bonding agent in the hopper 94 increases. The photoelectrical cells 114 and 116 are connected in convenient electrical circuits to control the operation of the motor 90, air cylinders 86 and 106 and the air supply to the hopper 94, as will be considered subsequently.

The means 24 for transferring bonding agent in the hopper 94 to the mixer 26 includes the conduit 118 extending between the fixed support 120 and mixer 26, the flexible conduit 122 extending between conduit 118 at the fixed support 120 and the hopper 94 and the air supply line 124 for feeding air under pressure, for example fifteen pounds per square inch, into the air manifold 123 to hopper 94 from a source of air under pressure (not shown). Hopper 94 is provided with a filter lining 125 similar to lining 58 of tank 44 for fluidizing the bonding agent as before.

In over-all operation, when it is desired to transfer weighed amounts of bonding agent in the sacks 14 to the mixer 26, a sack of bonding agent is placed by an operator on the open door 30. The operator thereafter closes a switch (not shown) operable to actuate the air cylinder 34 to pivot the door 30 clockwise around hinge 32, thereby closing the door and throwing the sack of bonding agent onto the knife blade 50. The sack of bonding agent is thus split open and falls to the grate 52. The bonding agent falls from the split sack 14 through the grate 52 through the open valve 42 into the tank 44. The door 30 is then opened either by automatic cycling or by operation of a second switch and the empty sack is removed from the grate 52. This operation is continued until a desired amount of bonding agent is positioned in the tank 44.

The operator then actuates another switch (not shown) which first causes the air cylinder 48 to be energized through convenient circuitry and valves to close the valve 42 which is substantially air tight and then opens a valve (not shown) to feed air under pressure into tank 44 through air supply line 56 and manifold 57. The air under pressure together with the flowable bonding agent which may be, for example, Hygeria wood flour, Sea Coal or Bentonite, passes through the conduit 54 and into the storage bin 18. The air then exhausts through the exhaust stack 60 which may include suitable filters provided in the storage bin 18 while the bonding agent which has been transferred a substantial distance is stored in the storage bin 18 until it is needed.

When it is desired to feed bonding agent to the mixer 26, the air cylinder 86 is actuated to fully open the opening 78 in the tank 66 so that the bonding agent which flows into the tank 66 through the open end 64 of storage bin 18 flows onto the disc 80 by gravity. Disc 80 is then rotated clockwise by motor 90 so that the bonding agent which flows from the opening 78 onto the disc 80 is cammed from the disc 80 by the baffle 74 and into the hopper 94. Actuation of the air cylinder 86 and motor 90 may be simultaneously accomplished by a single switch setting in motion a weighing and transferring cycle of the apparatus 22 and means 24.

As the bonding agent is fed into the hopper 94 the weight thereof will cause the hopper 94 to pivot the lever 100 about the pivot means 112 so that the end 110 thereof will eventually shade the photoelectric cell 114. The photoelectric cell 114 is arranged in an electrical control circuit (not shown) which will provide actuation of the air cylinder 86 to substantially reduce the area of the opening 78 on photoelectric cell 114 being shaded. Thus, as the weight of the bonding agent in the hopper 94 nears the desired weight thereof the total flow of bonding agent into the hopper 94 is substantially reduced.

When the weight of bonding agent in the hopper 94 is the desired weight, as set by the position of the weight 108 on the lever 100, the end 110 of the lever 100 shades the photoelectric cell 116. Shading the photoelectric cell 116 operates through convenient circuitry and valves (not shown) to completely close the opening 78, stop the motor 90, close the valve 104 through actuation of air cylinder 106, and permits air under pressure to pass through the air line 124 into the hopper 94 through manifold 123. The bonding agent in the hopper 94 is thus passed through the flexible conduit 122 and conduit 118 to the remotely located mixer 26.

Thus it will be seen that in accordance with the invention there is provided automatic weighing and transfer apparatus 10 whereby a predetermined amount of additive, such as a bonding agent may be added to granular material such as foundry sand in a mixer to provide close control of a physical property, such as the strength of the granular material which apparatus is simple, economical and efficient. In addition the weighing and transfer apparatus disclosed permits breaking open of sacks of additive at a location remote from the weighing location and weighing at a location remote from the point of mixing of the additive with the granular material whereby each of the separate operations may be carried on in a desired environment.

The modification 129 of the weighing and transfer apparatus of the invention partly illustrated in FIGURE 3 eliminates from the weighing and transfer apparatus 10 the storage bin 18, the weighing apparatus 22 and the means for transferring the bonding agent from the weighing apparatus 22 to the mixer 26. Thus, in the transfer apparatus illustrated in FIGURE 3, the bonding agent from tank 44 is transferred through the conduit 131 which is the same as conduit 54 of apparatus 10 into a structure 130 for feeding the bonding agent directly into a mixer 133 which is the same as the mixer 26.

The structure 130 includes the storage tank 132 having the funnel 134 including crossed baffles 136 in the discharge end thereof secured over the upper end. A discharge opening 135 and a discharge door 138 for opening 135 are provided at the bottom of the tank 132 and an air discharge conduit 140 is provided at the top of tank 132. The discharge door 138 is controlled by cylinder and piston structure 142 or other convenient means as in the weighing and transfer apparatus 10.

The tank 132 is positioned over rotatable table 144 and a baffle 146 is secured to the tank 132 whereby on rotation of the table 144 by means of motor 148 and transmission structure 150 with the gate 138 open the bonding agent passed into the lower portion of tank 132 through funnel 134 onto table 144 is discharged into the mixer 26 by camming action of the baffle 146.

In the modified apparatus 129 illustrated in FIGURE 3, the weight of bonding agent added may be varied by timing the opening and closing of the gate 138 by convenient actuating means for the piston and cylinder structure 142 (not shown).

The modified structure 152 illustrated in FIGURES 4 and 5 for opening sacks of bonding agent and transferring their contents through conduit 54 of FIGURE 1 or conduit 131 of FIGURE 3 may be used alternatively with the structure 12 for opening sacks of bonding agent described in the above consideration of the weighing and transferring apparatus 10.

The structure 152 for opening sacks of bonding agent comprises a bin 154 having a tapered bottom portion 156 including an opening 158 in the bottom thereof with a rubber seal 160 extending therearound. Grate 162 is positioned across the opening 158 as shown in FIGURE 4. Conical valve 164 is positioned in opening 160 and is actuated by convenient means such as piston and cylinder structure 166 at predetermined times to seal the opening 158. Piston and cylinder structure 166 may be secured in bin 154 by convenient means not shown.

Doors 170 and 172 are mounted across the open upper end of the bin 154 for pivotal movement on pivot mounting means 174 and 176 respectively on actuation of the piston and cylinder structures 178 and 180 respectively. Doors 170 and 172 include the stakes 182 and 184 thereon respectively.

Cover 186 is pivotally mounted on bin 154 by pivot hinge 188. A seal 190 is provided extending around the periphery of the cover 186 whereby on actuation of the piston and cylinder structure 192 the cover 186 is closed to seal the top of bin 154. Cover 186 is provided with the sack cutter 194 extending transversely thereof as shown best in FIGURE 5.

The sack opening structure 152 further includes the tank 196 located below and secured to the tapered portion 156 of the bin 154 for receiving bonding agent passing valve 164 and for transferring the bonding agent to the conduit 54. The tank 196 is exactly similar to the tank 44 illustrated best in FIGURE 1. An air conduit 198, air manifold 200 and annular filter 202 are provided in conjunction with tank 196 as before.

Thus, in operation with the valve 164 in an open position the doors 170 and 172 in a horizontal position and cover 186 in a vertical position, a sack of bonding agent is placed on the doors 170 and 172 on the stakes 182 and 184 which pierce the sack. The piston and cylinder structure 192 is actuated whereby the cover 186 closes to seal the bin 154 and slice the sack in two by means of the cutter 194. The piston and cylinder structures 178 and 180 are then actuated to pivot the doors 170 and 172 clockwise and counterclockwise respectively as indicated by the arrows in FIGURE 4 to empty the bonding agent from the split sack on the grate 162 through which it passes to be delivered into tank 196 passed valve 164. The split sack remains on the stakes 182 and 184.

The valve 164 is then closed by actuation of the cylinder and piston structure 166 and air is fed into the tank 196 through conduit 198, manifold 200 and filter 202 from a source and by means of a valve, both of which are not shown, to transfer the bonding agent into the conduit 54 or 131 as before.

The doors 170 and 172 are then returned to the horizontal position thereof. Valve 164 is open and cover 186 is open to permit removal of the empty sack and a repeat of the cycle of operation of the structure 162.

The modified weighing and transfer apparatus 204 illustrated in FIGURE 6 includes a structure 206 for opening sacks of bonding agent such as structure 12 or 152, means 208 for transferring the bonding agent from the structure 206 to storing and feeding apparatus 210, apparatus 210 for storing and bonding agent and feeding the bonding agent to a weighing apparatus 212, means 214 for transferring the weighed bonding agent from weighing apparatus 212 to mixer 216, physical properties testing apparatus 218, means 220 for transferring a sample of the granular material in mixer 216 to the physical properties testing apparatus 218 and apparatus 222 for controlling the weighing apparatus 212 in accordance with a tested physical property of granular material in mixer 216. Thus, with the weighing and transfer apparatus of FIGURE 6 the weight of bonding agent passed to a mixer 216 is controlled in accordance with a physical property of the granular material in the mixer 216 so that granular material having a predetermined physical property is automatically produced.

As mentioned above, the structure 206 may be the same as or similar to previously described structure 12 or 152. The storing and feeding apparatus may be similar to the bin 18 and feeding apparatus 20 of FIGURE 1 or the storing and feeding apparatus illustrated in FIGURE 3. The granular material mixer 216, batching hopper 224 and granular material storage bin 226 are conventional and will not be considered in further detail.

The physical properties testing apparatus 218 as shown in detail in FIGURE 7 comprises an endless belt 230 on which a sample of granular material is received which may be conveyed thereto from the mixer 216 by conventional means 220 known in the art including chute 228, rollers 232 and 234 for continuously moving belt 230 and back-up plate 236 for permitting compacting of granular material fed onto the belt 230 are also part of the apparatus 218.

The granular material fed onto belt 230 is passed beneath a strike-off plate 238 and compacted by means of roller 240 between the guide plates 242, all of which are part of the physical property testing apparatus 218. The strike-off plate 238 is supported in a fixed position over the belt 230 while the roller 240 is allowed to pivot about the fixed pivot pin 244 by means of the link 246 and pivot mounting 248.

The physical tester 218 is completed by the sled 250 including the runners 252 slidably positioned on the compacted surface of the granular material between the plates 242 and connected for pivotal movement about the fixed pivot 244 by means of the link 254. The runners 252 and link 254 are connected through the U-shaped member 256 including slots 258 in the parallel legs thereof for permitting vertical movement of the roller 260 in conjunction with the guide pins 262 supported in the slots 258. Roller 260 is rigidly connected to the core 264 of a linear variable differential transformer 265 while the winding 266 of the transformer is secured to the U-shaped member 256.

Thus, in operation as the compacted granular material passes beneath the runners 252 of the sled 260 the vertical position of the roller 260 relative to the sled runners 252 will provide an indication of the physical properties of the granular material. This indication is transformed into an electric signal by the linear variable differential transformer 265 on the conductors 268.

The apparatus 222 for controlling the weight of bonding agent weighed by the weighing apparatus 212 in accordance with a tested physical property of the granular material is best shown in FIGURE 8 in conjunction with the weighing apparatus 212. As previously considered, the weighing apparatus 212 includes the tank 270 pivotally supported by the pivot mounting means 272 on the end 274 of balance beam 276 which is mounted for pivoting on the knife edge 278. In operation of the weighing apparatus 212 as before, the quantity of bonding agent discharged into tank 270 through valve 280 and subsequently transferred to mixer 216 through conduit 282 on application of air pressure through conduit 284 and manifold 286 in each cycle of operation depends on the position of the weight 288 on the end 290 of the balance beam 276 in conjunction with the position of the photoelectric cell means 292.

To automatically vary the position of the weight 288 along the balance beam 276 in accordance with a signal from the linear variable differential transformer 265 on conductors 268, a screw 296 is provided on the balance beam 276 extending through the weight 288 and operable to traverse the weight 288 in opposite directions along the balance beam 276 on rotation thereof in opposite directions. Screw 296 is connected to the reversible motor 298 which is caused to rotate in a direction depending upon the polarity of the signal provided thereto over conductors 300.

On rotation of the motor 298, the pinion 302 is also caused to rotate in the same direction as the screw to rotate the gear 304 which is mounted on the shaft 308 to produce rotation of shaft 308 and a similar rotation of the cam 310. Cam 310 produces pivoting of the lever 312 on the knife edge 314 through pin 316 in accordance with the rotational position thereof. Pivoting of the lever 312 varies the position of the core 316 of the low voltage differential transformer 318 the winding 320 of which is rigidly supported on the balance beam 276 by means of the support arm 322.

The linear variable differential transformer 318 thus provides a signal over conductors 324 which when the weight 288 is properly positioned for a predetermined physical property of granular material passing beneath the roller 260 of the physical property testing apparatus 218, will exactly balance the electric signal from linear variable differential transformer 265 over conductors 268 so that no signal will be applied to motor 298 to further position the weight 288. Null circuits 325 for accompanying such result are well known in the linear variable differential transformer art and will therefore not be considered in detail herein.

Thus, it will be seen that with the structure illustrated in FIGURE 6, portions of which are illustrated in detail in FIGURES 7 and 8, the weight of bonding agent mixed with granular material in mixer 216 may be varied in accordance with a physical property of the granular material.

If it is desired to minimize the travel of the weight 288 on the balance beam 276 for each separate cycle of the weighing apparatus 212, it would be possible to provide a locking structure for the position of the core of the linear variable differential transformer 318 at any time the weight of bonding material in the tank 270 is below a predetermined amount which would be lower than the lowest required weight of bonding agent to be transferred to the mixer 216 in a single cycle as will be readily understood by those in the art.

Alternative physical property testing apparatus 330 is illustrated in FIGURES 9 through 11 and may be used in place of the physical property testing apparatus 218 illustrated in FIGURE 7.

The physical properties testing structure 330 includes the chute structure 332 for feeding granular material from a mixer 331 such as the mixer 216 into a cylindrical sample container 334. The hydraulic cylinder 336 and associated ram 338 and hydraulic actuating apparatus 340 is also part of the physical properties testing apparatus 330 along with the pneumatic cylinder 342 and ram 344 together with the pneumatic actuating apparatus 346. The physical property testing structure 330 is completed with the photoelectric apparatus 348 and the linear variable differential transformer 350 and pressure responsive actuating means 352 for transformer 350. The linear variable differential transformer 350 performs the same function as the transformer 265 of the property testing apparatus 218 illustrated in FIGURE 7 and in the weighing and transfer apparatus 204 transformer 350 under the control of the physical properties testing apparatus 330 could be substituted for transformer 265.

Chute 332 inclined as shown is hinged for transverse movement about the pivot hinge 333 by convenient means such as piston and cylinder structure 335 to periodically deposit a sample of granular material from mixer 331, a physical property of which it is desired to determine, in the sample container 334. The chute 332 is shown in the sample loading position in FIGURE 9.

The rams 344 and 338 are shown in a retracted position in FIGURE 9. In FIGURE 10, the rams 344 and 338 have been advanced to compress the sample specimen in the sample container 334 into a test cylinder which is preferably two inches in diameter in accordance with the usual testing standards. At this time the chute 332 is pivoted about hinge 333 to allow the ram 344 to compress the sample specimen. In FIGURE 11 the ram 338 has been raised to position the sample cylinder so that two inches thereof extends out of the sample container 334, again in accordance with the usual sample testing procedure. Ram 344 is positioned to apply compressive pressure on the test cylinder to test the cylinder to destruction.

The pneumatic actuating apparatus 346 and hydraulic actuating apparatus 340 together with the photoelectric apparatus 348 and the actuating structure 352 will be described in detail in conjunction with a cycle of operation of the physical properties testing apparatus 330.

At the start of a test cycle, the four way solenoid operated pneumatic valve 350 is deenergized as is the three-way solenoid operated valve 352 so that the end 354 of the cylinder 342 is opened to exhaust through bypass conduit 356 and exhaust conduit 358. The solenoid operated valves 360, 362 and 364 are closed at this time while the solenoid operated valve 366 is open, permitting air under a relatively high pressure, as, for example, eighty pounds per square inch, to pass through the valve 350 through conduit 346 into the end 368 of cylinder 342 to maintain the ram 344 in an upper position.

At the same time the hydraulic pump 370 is pumping hydraulic fluid from the hydraulic fluid reservoir 372 through the solenoid operated four-way hydraulic valve 374 into the end 376 of hydraulic cylinder 336 while the solenoid operated valve 378 is open so that fluid will be drained from the end 380 of the hydraulic cylinder 336 to position the ram 338 in a lower position as shown in FIGURE 9.

After the sample of granular material has been positioned in the sample container 334, the solenoid operated valve 350 is energized to feed the relatively high pneumatic pressure through valve 366, valve 350 and bypass conduit 356 into the end 354 of pneumatic cylinder 342. End 368 of cylinder 342 is exhausted through conduit 346, energized valve 350 and conduit 358. Ram 344 is thus caused to descend under substantial pressure to cause compression of the sample of granular material in the sample container 334.

At the same time the valve 374 is actuated to exhaust hydraulic fluid from the end 376 of hydraulic cylinder 336 and pump hydraulic fluid into the end 380 of hydraulic cylinder 336 through the solenoid operated valve 378. The hydraulic pressure in end 380 of cylinder 336 is maintained at substantially the same pressure as the high pressure air fed through valve 366 from pressure regulator 382 by means of the pressure regulating valve 384 and pump return conduit 386. The sample of granular material is thus compressed between rams 338 and 344 at a known force for a predetermined time which may of course be fixed by conventional timers.

At the end of the predetermined period the valve 350 is deenergized to exhaust the air pressure in end 354 of the pneumatic cylinder 342 and feed ram withdrawing pressure into end 368 of pneumatic cylinder 342 to cause pneumatic cylinder 342 to assume the upper position thereof. At this time ram 338 forces the test cylinder out of the sample container 334 until the test cylinder or some point of the ram 344 deenergizes one of the photo-electric cells of photoelectric sensing means 348 such as by cutting a light beam falling on the cell to energize valve 378 and lock the ram 338 in an upper position. The photoelectric means 348 is positioned to provide an exact test cylinder height above the sample container 334 as previously indicated.

The valve 366 is then closed and the valve 364 opened while the valve 350 is energized to exhaust the end 368 of the pneumatic cylinder 342 and to apply the relatively low pressure, such as twenty pounds per square inch, from the low pressure air supply regulator 387 to the pressure regulator 388 through the energized three-way valve 352. The valves 360 and 362 as well as the motor 390 are energized at this time. The low pressure air from the pressure regulator 387 is gradually increased through the pressure regulator 388 due to the energization of the motor 390 and the changing of the pressure setting of the pressure regulator 388 thereby due to the driving connection 392 therebetween.

The increasing low pressure air is applied in the end 354 of pneumatic cylinder 342 and to the underside of the diaphragm 394 to which the core 396 of the linear variable differential transformer 350 is secured. The ram 344 will thus move down into contact with the raised test cylinder and a force will gradually be applied to the cylinder which will move the core 396 of the linear variable differential transformer 350 with respect to the winding 398 thereof to produce a variable electric signal. The maximum value of the signal will be determined by the ultimate compression strength of the test cylinder as evidenced by the pressure out of pressure regulator 388 when the test cylinder breaks.

On breaking of the test cylinder, the ram 344 will descend rapidly until it breaks the circuit through another photoelectric cell of the photoelectric means 348 by means of flag 400. On the flag 400 breaking a circuit in the photoelectric means 348 the valves and regulators are returned to the original position thereof at the start of a cycle so that the physical properties testing apparatus 330 is ready for another cycle of operation.

A modification 402 of the physical properties testing apparatus 330 is illustrated in FIGURE 12. In the apparatus 402 the linear variable differential transformers have been eliminated and the means 222 for controlling the amount of bonding agent weighed in accordance with the physical properties testing apparatus 402 is primarily mechanical rather than electrical.

In the physical properties testing apparatus 402 a pair of pneumatic cylinders 404 and 406 are provided having rams 408 and 410 respectively reciprocally mounted therein for movement in relation to a sample container 412 in a manner previously described in conjunction with the rams 338 and 344 and sample container 334 of the physical properties testing apparatus 330 illustrated in FIGURES 9 through 11. Apparatus similar to chute 332 for loading a sample of granular material in the sample container 412 may be used in conjunction with the physical properties testing apparatus 402.

Again, the pneumatic apparatus 414 and 416 and the apparatus 418 for adjusting the weight of the bonding agent weighed in accordance with a tested physical property of the sample granular material will be considered in detail in conjunction with a cycle of operation of apparatus 402.

During feeding of a sample of granular material into the sample container 412, the four-way solenoid actuated valve 420 is energized to feed air into end 422 of cylinder 406 and to exhaust air from end 424 of cylinder 406. Similarly, the four-way valve 426 is energized to provide air under substantial pressure from high pressure regulator 428 in the end 430 of cylinder 404 and at the same time to exhaust air from the end 434 of cylinder 404 through the open solenoid valve 436, valve 426 and exhaust conduit 438. At this time the solenoid actuated valve 440 will be closed. The rams 408 and 410 will thus be at an upper and lower limit respectively.

After the sample of granular material has been positioned in the container 412 the valve 420 is actuated to feed air under pressure into end 424 of cylinder 406 and to exhaust the air from the end 422 thereof to raise the ram 410 under a regulated pressure of, for example, eighty pounds per square inch, from pressure regulator 428 through conduit 442. At the same time the valve 426 is actuated to reverse the connection of the ends 430 and 434 of the cylinder 404 to the exhaust conduit 438 and pressure regulator 428 to produce a downward movement of the ram 408 under the relatively high pressure. The sample of granular material in the container 412 is thus compressed as before for a predetermined time at a regulated pressure to provide a test cylinder.

The valve 426 is then actuated to raise the ram 408 as before whereby the ram 410 moves the compressed specimen a predetermined distance out of the container 412. The exact distance the sample specimen moves out of the sample container is important and can be maintained by a photoelectric cell circuit as indicated in conjunction with the physical property testing apparatus 330 or may be maintained as a result of the physical dimensions of the cylinder 406, the granular material sample and the length of time of compression of the sample at the determined high pressure.

Then, valve 436 is closed, the valve 426 is caused to open the end 430 of the cylinder 404 to the exhaust conduit 438 through valve 432 and the valve 440 is opened whereby air at a gradually increasing relatively low pressure from the pressure regulator 444 as controlled by the motor 448 and valve 446 connected by the screw adjustment 450 is admitted into end 434 of cylinder 404 and into conduit 452. Thus, as the pressure builds up in end 434 of cylinder 404 to the breaking point of the test cylinder extending out of the container 412 pressure similarly gradually builds up in conduit 452 whereby the piston 454 in cylinder 456 and the piston rod 460 to which it is rigidly secured are moved upward in FIGURE 12 against the bias of the spring 458 applied thereto.

Upward movement of the rod 460 carries with it the collar 462 which is rigidly secured thereto and consequently moves upward in FIGURE 12 the member 464 which is slidable on the shaft 466. Member 464 has attached thereto the end 468 of the chain 470. The end 472 of chain 470 is secured to the end 474 of balance beam 476. Thus as the pressure increases in conduit 452, the weight of the chain 470 which is carried by the end 474 of beam 476 is decreased.

When the test specimen breaks, the pressure in the conduit 452 is suddenly lowered so that the rod 460 drops abruptly to pivot the lever 478 clockwise about its pivot mounting 480 due to engagement of the friction shoe 482 under bias of the spring 484 with the rod 460. Clockwise movement of the lever 478 activates the microswitch 486 to break the electric circuit through the switch 486 to the solenoid 488 of the solenoid latch 490.

On breaking of the electric circuit by the switch 486, the solenoid 488 is deenergized and the spring biased armature 492 of latch 490 is urged into engagement with the shaft 466. Thus the member 464 is at this time locked in engagement with the shaft 466. Thus the member 464 will assume a position on shaft 466 during the testing of a test cylinder which it will maintain on breaking of the test cylinder.

Bonding agent is then weighed into the weighing tank 494 as before in accordance with the weight of the chain 470 supported by the end 474 of the balance beam 476. Subsequently, during another cycle of operation of the physical properties testing apparatus 402, as the pressure starts to rise in the conduit 452 and the rod 460 is moved upward the friction shoe 482 will cause pivoting of the lever 478 in a counterclockwise direction to again close the circuit through the micro-switch 486 and release the member 464 from the shaft 466 whereby the member 464 moves down shaft 466 to engage the collar 462 on rod 460 ready for a second cycle of operation.

Proper timing and actuating means for the various valves and regulators in the physical properties testing apparatus 330 and 402 have been assumed in the explanation of the operation thereof. It will be understood that the actuating and timing circuits would be easily produced by the usual mechanic in the art and could quite possibly take the form shown in FIGURE 12 of a shaft 496 driven by a motor 498 having located thereon a plurality of cams 500 for closing and opening switches 502 as required during rotation of motor 498. The various solenoid operated valves and circuits would then be connected to the leads 504 of the switches 502 to be energized as required. Since such energized actuating and timing structures are well known in the art, the exact details thereof are not set forth herein.

Apparatus is also provided as illustrated in FIGURES 13 and 14 for compensating the material weighing and transfer apparatus of the invention to take into account different granular material mixes or types of granular material.

Thus, in FIGURE 13 a chain 506 is provided having one end 508 connected to the end 510 of the balance beam 512 to aid the weight 514 in balancing granular material placed in the tank 516 mounted on the end 518 of the balance beam 512. The other end 520 of chain 506 is secured to a drum 522 which is rotatably mounted on a shaft 524 driven by a servo-motor 526. A second servo-motor 528 is positioned in a remote location adjacent an operator's position for the weighing and transfer apparatus and is connected to the servo-motor 526 by conductors 530.

The shaft 532 of servo-motor 528 is angularly positionable by means of a control knob 534 having indicator 536 thereon so that the angular position of shaft 532 may be set to indicate different granular materials or mixes thereof indicated on dial 540. Servo-motors 528 and 526 may be energized by convenient means such as power supply 542.

Thus, in operation after a particular granular material mix has been selected, the operator at a location remote from the balance beam 512 will rotate the indicator 536 to the selected granular material mix on dial 540 thus angularly positioning the shaft 532 of servo-motor 528. The servo-motor 526 will thus be caused to angularly rotate the shaft 524 in accordance with the rotation of the shaft 532 to rotate drum 522 and vary the length of the portion of the chain 506 which is supported by the balance beam 512 so that the bonding agent weighed and transferred to the mixer is compensated for the granular material mix in the mixer.

The apparatus for compensating the weighing and transfer apparatus of the invention for the temperature of granular material mixed is illustrated in FIGURES 15 and 16 again includes a chain 544 secured at end 546 to end 548 of balance beam 550 to aid the weight 552 in balancing granular material positioned in the tank 554 on the end 556 of balance beam 550. End 558 of chain 544 is connected to drum 560 which is rotatably mounted on end 562 of shaft 564. The other end 566 of shaft 564 is connected to a temperature indicator 568 having a temperature dial 570 and indicator 572 thereon.

Thus in operation temperature of granular material in granular material storage bin 574 is sensed by means of thermo-couple 576 to produce an electric signal proportional to the temperature on conductors 578 fed to amplifier 580 and then to servo-motor 582 over conductors 584. The shaft 564 is driven by servo-motor 582 through the pinion 586 and gear 588 so that the chain 544 is wound on drum 560 in accordance with the temperature of the granular material in the storage bin 574, which is approximately at the temperature of the granular material mix in the mixer 590, to vary the weight of the chain 544 carried by the balance beam 550 and, therefore, the weight of the bonding agent which is fed to the mixer 590 in accordance with the temperature of the granular material. The indicator 572 is similarly driven by the shaft 564 to indicate the sensed temperature on dial 570.

While one embodiment of the present invention and modifications thereof have been considered in detail, it will be understood that other embodiments and modifications thereof are contemplated. It is the intention to include all embodiments and modifications which are defined by the appended claims within the scope of the invention.

What I claim as my invention is:

1. Weighing and transfer apparatus comprising structure for opening individual sacks of finely divided material, a storage bin, means operably associated with the structure for opening sacks and the storage bin for transferring the material to the storage bin, weighing apparatus for weighing a predetermined weight of the material, structure operably associated with the storage bin and weighing apparatus for feeding the material from the storage bin into the weighing apparatus, a mixer for mixing granular material, means operably associated with the weighing apparatus and mixer for transferring the predetermined weight of material from the weighing apparatus to the mixer, physical properties testing apparatus for testing a physical property of a sample of the material in the mixer and developing a signal in accordance therewith, means for transferring a sample of the material in the mixer to the physical properties testing apparatus and means for controlling the weighing apparatus to vary the weight of the material weighed by the weighing apparatus in accordance with a first signal developed by the physical properties testing apparatus.

2. Structure as set forth in claim 1 and further including means to compensate the weighing apparatus to vary the weight of material weighed thereby in accordance with the granular material in the mixer.

3. Structure as set forth in claim 1 and further including means to compensate the weighing apparatus to vary the weight of material weighed thereby in accordance with the temperature of the granular material in the mixer.

4. Structure as set forth in claim 1 wherein the physical properties testing apparatus comprises an endless movable belt, means for compacting a sample of granular material transferred from the mixer fed onto the continuous belt, a sled supported on the compacted sample of granular material as the granular material moves with the endless belt including runners engaging the surface of the compacted granular material, a roller supported by the sled in engagement with the compacted surface of the granular material movable in relation to the runners of the sled in accordance with a physical property of the granular material, a linear variable differential transformer including a core secured to the roller for movement therewith and a core secured to the sled runners for movement therewith whereby relative movement between the core and coil of the transformer is produced in accordance with the physical property of the granular material to provide an electric signal proportional to the physical property of the granular material.

5. Structure as set forth in claim 1 wherein the weighing apparatus includes a first balance beam having a weight positionable along one end thereof for determining the weight of material weighed thereby and wherein the means for controlling the weighing apparatus to vary the weight of material weighed thereby in accordance with the first signal developed by the physical properties testing apparatus comprises a screw extending longitudinally of the first balance beam and connected to the weight for moving the weight along the first balance beam in opposite directions on rotation of the screw in opposite directions, a servo-motor connected to the screw for rotation thereof in opposite directions in accordance with a third signal received thereby, a cam, means for rotating the cam in accordance with the rotation of the screw, a second balance beam secured to the first balance beam and pivoted in accordance with the rotation of said cam, a linear variable differential transformer, the core of which is secured to the second balance beam for movement therewith and having a coil secured to the first balance beam for movement relative to the core in accordance with the rotation of said screw to provide a second signal and a null circuit for providing the third signal for the motor of a polarity and magnitude representative of the difference between the first and second signals.

6. Structure for controlling weighing apparatus including a balance beam, a weight variably positioned on one end of the balance beam, a hopper for receiving material to be weighed positioned on the other end of the balance beam, means responsive to a physical property of the material weighed in the weighing apparataus for developing a first signal representative thereof, means for moving the weight along the balance beam in response to a third signal, means responsive to the means for moving the weight along the balance beam for developing a second signal representative of the movement of the weight along the balance beam, and means responsive to the first and second signals jointly to produce the third signal.

7. Structure as set forth in claim 6 wherein the means for moving the weight along the balance beam comprises a screw threadedly engaging the weight and rotatably held in an axially fixed position and an electric motor for rotating the screw.

8. Structure as set forth in claim 6 wherein the means for developing a second signal representative of the movement of the weight along the balance beam comprises a second balance beam carried by the first balance beam at said one end thereof, a cam pin at one end and one member of a linear variable differential transformer secured to the other end of the second balance beam, a cam engaged with the cam pin and means for rotating the cam in response to movement of the weight along the first mentioned balance beam to correspondingly vary the position of the one member of the differential transformer relative to the other member thereof.

9. Weighing and transfer apparatus comprising a storage bin for material to be weighed and transferred, weighing apparatus for weighing a predetermined quantity of material positiond therein including a centrally pivotally mounted balance beam, a hopper pivotally mounted on one end of the balance beam for receiving the predetermined quantity of material and a weight variably positioned on the other end of the balance beam, structure positioned between the storage bin and the weighing apparatus and responsive to the weighing apparatus for feeding a predetermined weight of material from the storage bin into the weighing apparatus including a vertically extending cylindrical member open at both ends and having a transverse opening therethrough at the bottom thereof positioned to receive the material to be weighed in one end thereof, a disc having a diameter larger than the diameter of the cylindrical member positioned over the bottom of the cylindrical member, a baffle secured to the cylindrical member over the outer periphery of the disc for camming material from the disc, means for rotating the disc and a photoelectric cell positioned adjacent one end of said balance beam for controlling the operation of the means for rotating the disc.

10. Structure as set forth in claim 9 and further including a door for said opening through said cylindrical member, means for variably positioning said door and a second photoelectric cell positioned adjacent one end of the balance beam for actuating the means for variably positioning the door.

11. Structure as set forth in claim 9 and further including means for varying the weight of material weighed by the weighing apparatus in accordance with a physical property of the material as represented by a first linear variable differential transformer signal comprising a screw extending longitudinally of the balance beam and connected to the weight for moving the weight along the balance beam in opposite directions on rotation of the screw in opposite directions, a servo-motor connected to the screw for rotation thereof in opposite directions in accordance with a third signal received thereby, a cam, means for rotating the cam in accordance with the rotation of the screw, a second balance beam secured to the first balance beam and pivoted in accordance with the rotation of said cam, a linear variable differential transformer, the core of which is secured to the second balance beam for movement therewith and having a coil secured to the first balance beam for movement relative to the core in accordance with the rotation of said screw to provide a second signal and a null circuit for providing the third signal for the motor of a polarity and magnitude representative of the difference between the first and second signals.

12. Structure as set forth in claim 11 and further including a door for said opening through said cylindrical member, means for variably positioning said door and a second photoelectric cell positioned adjacent one end of the balance beam for actuating the means for variably positioning the door.

13. Weighing and transfer apparatus comprising a storage bin for material to be weighed and transferred, weighing apparatus for weighing a predetermined quantity of material positioned therein including a balance beam, a hopper mounted on the balance beam for receiving the predetermined quantity of material and a weight variably positioned on the balance beam and structure positioned between the storage bin and the weighing apparatus and responsive to the weighing apparatus for feeding a predetermined weight of material from the storage bin into the weighing apparatus including a vertically extending member having an opening therethrough at the bottom thereof, a disc positioned over the bottom of the cylindrical member, a baffle secured over the outer periphery of the disc for camming material from the disc, means for rotating the disc and a photoelectric cell positioned adjacent said balance beam for controlling the operation of the means for rotating the disc.

14. Structure as set forth in claim 13 and further including a door for the opening through the vertically extending member, means for variably positioning said door and a second photoelectric cell positioned adjacent the balance beam for actuating the means for variably positioning the door.

15. Structure for controlling weighing apparatus including a balance beam having a weight positionable along one end thereof for determining the weight of material weighed thereby to vary the weight of material weighed thereby in accordance with a physical property of the material as represented by a first linear variable differential transformer signal comprising a screw extending longitudinally of the balance beam and connected to the weight for moving the weight along the balance beam in opposite directions on rotation of the screw in opposite directions, a servo-motor connected to the screw for rotation thereof in opposite directions in accordance with a third signal received thereby, a cam, means for rotating the cam in accordance with the rotation of the screw, a second balance beam secured to the first balance beam and pivoted in accordance with the rotation of said cam, a linear variable differential transformer, the core of which is secured to the second balance beam for movement therewith and having a coil secured to the first balance beam for movement relative to the core in accordance with the rotation of said screw to provide a second signal and a null circuit for providing the third signal for the motor of a polarity and magnitude representative of the difference between the first and second signals.

16. Structure for controlling weighing apparatus, including a balance beam having a weight positionable therealong for determining the weight of material weighed thereby, in accordance with a physical property of the material as represented by a first signal, comprising means engaged with said weight for moving the weight along the balance beam in opposite directions in accordance with the third signal, a cam operably associated with said means for moving the weight along the balance beam, means connected between the cam and weight moving means for rotating the cam in accordance with the first signal, a second balance beam secured to the first balance beam movable in accordance with the rotation of the cam and means connected between the first and second balance beams for providing a second signal representative of the relative position of the first and second balance beams and a null circuit for providing the third signal having a polarity and magnitude representative of the difference between the first and second signals.

17. Weighing apparatus comprising a centrally pivotally mounted balance beam, means pivotally supported on one end of the balance beam for receiving material to be weighed therein, means for producing a first signal representative of a physical property of the material to be weighed, a weight positioned on and movable along the other end of the balance beam, means connected to the weight operable on energization to move the weight along the other end of the balance beam, a second balance beam carried by said first balance beam, means connected to said means connected to the weight for moving the weight along the first balance beam and engageable with the second balance beam for moving the second balance beam into a position representative of the position of the weight on the first balance beam, means connected between the first and second balance beams for producing a second signal representative of the relative position of the two balance beams, a null circuit connected to the said means for producing a signal representative of the physical property to be weighed and the said means for producing a signal representative of the relative position of the two balance beams for producing a third signal and, means for connecting the third signal to the said means for moving the weight along the first balance beam to energize the means for moving the weight along the first balance beam.

References Cited by the Examiner

UNITED STATES PATENTS

| | | | |
|---|---|---|---|
| 1,511,950 | 10/24 | Debay | 177—116 |
| 1,755,103 | 4/30 | Davis | 177—116 X |
| 1,790,813 | 2/31 | Holloran | 177—1 |
| 2,078,599 | 4/37 | McCauley | 214—305 |
| 2,232,404 | 2/41 | Pratt | 177—119 X |
| 2,247,553 | 7/41 | Hutchinson | 73—54 |
| 2,372,595 | 3/45 | Maxon | 73—54 |
| 2,384,228 | 9/45 | Allen | 177—114 X |
| 2,650,057 | 8/53 | Goland | 177—210 X |
| 2,727,733 | 12/55 | Carswell | 177 |
| 2,750,144 | 6/56 | Beckwith | 177—1 |
| 2,765,160 | 10/56 | Dietert | 177—214 X |
| 2,898,158 | 8/59 | Pollock | 302—53 |
| 2,930,501 | 3/60 | Cotterell | 214—305 |
| 3,001,829 | 9/61 | Saint Martin | 302—53 |
| 3,084,551 | 4/63 | Westman | 177—210 |

FOREIGN PATENTS

| | | |
|---|---|---|
| 273,368 | 4/14 | Germany. |
| 785,495 | 10/57 | Great Britain. |

LEO SMILOW, *Primary Examiner.*